(12) United States Patent
Crossley

(10) Patent No.: US 11,834,344 B2
(45) Date of Patent: Dec. 5, 2023

(54) SYNTHESIS OF AND USES OF ALKALINE EARTH METAL STANNATES

(71) Applicant: William Blythe Limited, Accrington (GB)

(72) Inventor: David Crossley, Clitheroe (GB)

(73) Assignee: WILLIAM BLYTHE LIMITED, Accrington (GB)

( * ) Notice: Subject to any disclaimer, the term of this patent is extended or adjusted under 35 U.S.C. 154(b) by 1200 days.

(21) Appl. No.: 16/324,825

(22) PCT Filed: Aug. 4, 2017

(86) PCT No.: PCT/GB2017/052304
§ 371 (c)(1),
(2) Date: Feb. 11, 2019

(87) PCT Pub. No.: WO2018/029449
PCT Pub. Date: Feb. 15, 2018

(65) Prior Publication Data
US 2019/0177177 A1    Jun. 13, 2019

(30) Foreign Application Priority Data
Aug. 12, 2016 (GB) ........................... 1613887

(51) Int. Cl.
*C01G 19/00* (2006.01)
*C08K 3/22* (2006.01)
(Continued)

(52) U.S. Cl.
CPC ........ *C01G 19/006* (2013.01); *B29C 45/0001* (2013.01); *C01G 19/00* (2013.01); *C08J 3/22* (2013.01); *C08J 3/226* (2013.01); *C08K 3/22* (2013.01); *B29K 2027/06* (2013.01); *B29K 2105/0005* (2013.01); *C01P 2004/61* (2013.01);
(Continued)

(58) Field of Classification Search
None
See application file for complete search history.

(56) References Cited

U.S. PATENT DOCUMENTS

| | | | | |
|---|---|---|---|---|
| 5,338,791 A | * | 8/1994 | Chaplin | C08K 3/24 524/401 |
| 2013/0296466 A1 | * | 11/2013 | Reimer | C01F 7/023 524/786 |
| 2018/0312646 A1 | * | 11/2018 | Nishiguchi | B29B 7/02 |

FOREIGN PATENT DOCUMENTS

| | | | | |
|---|---|---|---|---|
| CA | 2178892 | * | 12/1996 | |
| CA | 2630003 A1 | * | 5/2007 | C08L 23/0853 |

(Continued)

OTHER PUBLICATIONS

Machine translation of Kyoko et al., JP H0524835A (Year: 1993).*
(Continued)

*Primary Examiner* — Coris Fung
*Assistant Examiner* — Keling Zhang
(74) *Attorney, Agent, or Firm* — Kilyk & Bowersox, P.L.L.C.

(57) ABSTRACT

The present invention provides a particularly advantageous form of alkaline earth metal hydroxystannate and alkaline earth metal stannate exhibiting a BET specific surface area of from 20 to 200 m2/g. A method of producing such particulate material and evidence of its benefits in use such as in at a reduction in a polymer sample at elevated temperature is also disclosed.

7 Claims, 3 Drawing Sheets

(51) Int. Cl.
*C08J 3/22* (2006.01)
*B29C 45/00* (2006.01)
*B29K 27/06* (2006.01)
*B29K 105/00* (2006.01)

(52) U.S. Cl.
CPC ....... *C01P 2006/12* (2013.01); *C08J 2427/06* (2013.01); *C08J 2477/00* (2013.01); *C08K 2003/2231* (2013.01); *C08K 2201/005* (2013.01); *C08K 2201/006* (2013.01)

(56) References Cited

FOREIGN PATENT DOCUMENTS

| CN | 1166441 | * | 6/2004 | .......... C08L 23/0853 |
|---|---|---|---|---|
| CN | 101879444 | | 11/2010 | |
| CN | 103613118 | | 3/2014 | |
| CN | 105439555 | | 3/2016 | |
| GB | 2324523 | | 10/1998 | |
| GB | 2530108 A | * | 3/2016 | .......... C01G 19/006 |
| JP | S59156915 | | 9/1984 | |
| JP | H0524835 A | * | 2/1993 | ............. C01G 19/00 |
| JP | 2006176611 A | * | 7/2006 | ............. C08L 23/06 |
| WO | 98/55541 | | 12/1998 | |

OTHER PUBLICATIONS

Machine translation of Masami et al., JP 2006176 (Year: 2006).*
T. Iveticl, M. V. Nikolic, P. M. Nikolic, V. Blagojevic, S. Ouric, T. Sreckovicand M. M. Ristic, Science of Sintering, 39 (2007) 153-160, Investigation of Zinc Stannate Synthesis Using Photoacoustic Spectroscopy.
Pfaff et al., "Wet chemical synthesis of BaSnO3 and Ba2SO4 powders", J. European Ceramic Soc., 12(2), 1993, 159-164.
Lu et al., "Hydrothermal synthesis of nanocrystalline BaSnO3 using a SnO2.xH2O sol", J. European Ceramic Soc., 25(6), 2005, 919-925.
Buscaglia et al., "Synthesis and characterization of BaSn(OH)6 and BaSnO3 acicular particles", J. Materials Research, 18(3), 2003, 560-566.
International Search Report for Application No. PCT/GB2017/052304 dated Oct. 23, 2017.
Search Report for Application No. GB1613887.7 dated Jan. 30, 2017.
Xiaohong Wu, "A Two-Step Method to Synthesize BaSn(OH)6 Crystalline Nanorods and Their Thermal Decomposition to Barium Stannate", Journal of Nanomaterials, Oct. 4, 2011, pp. 1-7, vol. 2012, Article ID 912731, Hindawi Publishing Corporation, China.
Chinese Search Report and Translation of Application No. 2017800493744 dated Feb. 26, 2021.

* cited by examiner

SYNTHESIS OF AND USES OF ALKALINE EARTH METAL STANNATES

The present invention relates to improved physical forms of alkaline earth metal stannates, means for their production and uses.

Alkaline earth metal stannates are widely used in industry and provide an alternative to zinc stannate as, for example, flame retardants. Historically, whilst alkaline earth metal stannates have been disclosed for this purpose such as in WO 98/55541 they have not found widespread use as zinc stannate has generally provided better thermal stabilisation properties of plastics, such as polyvinyl chloride, polyolefins and polyamides.

The synthesis of Magnesium stannate is disclosed in CN103613118A and Calcium stannate in JP 59156915, both of which provide a powder but not of a high surface area as even when fine the particles have a cubic crystal habit.

Given that the zinc ion is chemically quite similar to magnesium and calcium then it will be expected that similar properties might be obtained and if this can be achieved then applications exist where it may be beneficial to utilise calcium or magnesium stannate in place of a zinc stannate. There is therefore a need to provide alkaline earth metal stannate of improved efficacy so as to broaden the portfolio of components available to the formulation chemist, such as a person formulating flame retardant plastics products.

The present invention provides an alkaline earth metal stannate, $MSnO_3$, or alkaline earth metal hydroxy stannate $MSn(OH)_6$, where M is one of Mg, Ca or Ba; having a service area using the B.E.T. method of high surface area, that service area being 20 to 200 $m^2/g$.

The present invention also provides a method of production of an alkaline metal stannate by precipitation, the method comprising the steps:

providing an agitated aqueous solution of a calcium salt in the range 20% to 50% by weight at a specified temperature between 25° C. and 40° C.;

introducing, preferably below the surface of the calcium salt solution, with mixing into said solution approximately a molar equivalent of alkali metal stannate at a temperature in the range 35° C. to 45° C.;

completing the introduction with agitation for a time period in the region of 1 to 5 hours;

subsequently adjusting pH of the composition to between 6.0 and 7.0 using the acid equivalent of the calcium salt (for example hydrochloric acid when calcium chloride is used) said acid being in the concentration range of 10% to 30% by weight acid; to precipitate alkaline earth metal stannate;

preferably isolating and optionally washing with water the resultant precipitate. More preferably drying to less than 0.5% moisture.

The agitated solution of the salt is preferably at a lower temperature than that of the introduced alkali metal stannate and this appears to contribute to the high surface area effect.

The above outline method is also applicable to the magnesium and barium stannate synthetic methods.

This method provides a high surface area alkaline earth metal stannate having advantageous properties.

The present invention also provides the use of an alkaline earth metal stannate, preferably the high surface area stannate described above, for the purposes of, one or more of:

acting as a buffer in a plastics composition comprising an acid;

acting as a lubricant for injection molding of a plastics composition; and preparing a masterbatch comprising greater than 20% by weight alkaline earth metal stannate for use in producing a polymer article.

In the present invention, the alkaline earth metal is selected from magnesium, calcium or barium and is preferably calcium. Calcium has been found to provide the most beneficial effect for the high surface area particles available using the present invention. The high surface area is preferably in the range 20 to 200 $m^2/g$, more preferably in the range 50 to 90 $m^2/g$, most preferably in the range 60 to 80 $m^2/g$ very high surface area has been found to give high friability and dusting making it unsuitable for many industrial uses, low surface area has been found to mitigate the beneficial effects of the materials producible by the present invention. Alternatively, but preferably in combination with the particle size selection is the range Surface Weighted Mean $D_{[3,2]}$ of 0.5 to 1 to 10 µm, preferably 1 to 4 µm, most preferably 1.5 to 3.0 µm particle size of the material as measured by a light scattering/measuring technique such as described herein. This gives particles of a handleable form for commercial use. The preferred properties as obtained using the illustrated synthetic route are 60 to 80 $m^2/g$ surface area and 1.5 to 3.0 µm particle size.

In the method of the present invention the calcium salt is preferably selected from one or more of the chloride, nitrate or sulphate, and in the instance of barium it is the nitrate. In the instance of magnesium or calcium it is preferably the chloride, calcium chloride is the most preferred as this gives rise to a uniform precipitate of high surface area. The alkali metal stannate is preferably sodium stannate. The most preferred reaction is therefore:

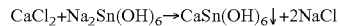

$$CaCl_2 + Na_2Sn(OH)_6 \rightarrow CaSn(OH)_6 \downarrow + 2NaCl$$

the isolating step of the precipitate may be carried out using a conventional filter apparatus such as a Nutsche™ Filter which can be considered as the industrial version of the well-known laboratory scale Buchner Funnel except that it is designed to operate under either using vacuum or pressure. The resultant filtrate may then be dried. The present method provides a filtrate of high surface area but which is not unduly friable and dusty making it particular suitable for industrial use. Pre-calcining (i.e. before calcining) the filtrate product is the alkaline earth metal hydroxystannate, for example $CaSn(OH)_6$. The filtrate may be calcined, such as in the region 380° C. to 500° C., most preferably at 400° C.+/−10° C. to provide a high surface area alkaline earth metal stannate $CaSnO_3$, which remains not unduly friable and dusty. The method of the present invention preferably provides an amorphous solid (see figures) and this is more effective than the cubic crystal form, such as provided from JP 59156915, such as illustrated in images 6 on pages 70 and 71 of that document. Specifically calcining at 380° C., for say 15 minutes, gives a drier solid with the product of the method of the present invention, it being hypothesised that the cubic crystal can entrain residual water in the crystal lattice. A dry solid is preferable for use when incorporating into a polymer, such as PVC for use in extrusion processing.

The preferred pH range of the composition is a pH of 6.5 to 6.7 and the composition is preferably agitated for 20 to 40 minutes before further adjustment into the required range. This pH range has been found to provide high surface area for the precipitate but without undue dusting or friability of isolated solid. The preferred acid is 20% by weight hydrochloric acid. The molar equivalent may be +/−20%, preferably +/−10% of equivalence.

A specific and optimised example of the method of the present invention is as follows:

1. Using 200-liter tank, charge 90 liters of water.
2. Activate using an agitator, and add 130.2 kg of 36% calcium chloride solution.
3. Equilibrate the temperature to 30° C.
4. Using a 1000l container dissolve in 745 liters of water sodium stannate to provide a concentration of 7.5% Sn (the sodium stannate not necessarily originate as a solid).
5. Equilibrate the temperature of the stannate solution 40° C.+/−2° C.
6. Charge the stannate solution into the tank over 3½ hours, adding the feed sub-surface. The rate of addition is approximately 3.5 liters/min.
7. After addition of all the sodium stannate solution, the pH of the reaction is adjusted to between 6.5 and 6.7 using 20% hydrochloric acid solution.
8. Allow the solution to mix for 30 minutes, re-check the pH, and adjust to between 6.5 and 6.7 if necessary.
9. The slurry is then charged to the Nutsche™ filter and washed with deionised water until the conductivity of the filtrate is >100 μS/cm. And optionally:
10. Once this is achieved the wet-cake is transferred to trays and dried in an oven
11. Then kibbled & screened, product is then packed off into standard 25-liter plastic pails The parameters of product produced by this process are:

Particle size using a Malvern master sizer 2000, at a Concentration: 0.0072% Vol in water are: Specific Surface Area: 2.11 $m^2/g$ (External Particle), Surface Weighted Mean D[3,2]: 2.842 um, Vol. Weighted Mean D[4,3]: 6.874 um. Using a BET method, the surface area is 60 $m^2/g$ (Internal Particle). This is the high surface area material tested as disclosed herein.

The method of the present invention provides a high surface area low friability alkali metal hydroxy stannate and a similar form of alkali metal stannate when calcined.

The present invention also provides the use of an alkaline earth metal stannate to buffer, or simply to remove acid materials from polymers.

This is a particularly important problem as many polymers comprise components, which, for example, at high temperature liberate an acid. This may arise from an additive to the polymer or from the polymer itself. For example, polyvinyl chloride when heated evolves hydrochloric acid, on prolonged heating this can give an unnecessary environmental exposure and polymer degradation. This is significant in use but also in polymer processing where the factory environment may be unnecessarily contaminated, such as with low levels of HCl from high-temperature PVC which may give rise to undesirable acid levels and associated equipment corrosion. The present invention therefore includes the use of an alkaline earth metal stannate in combination with a polymer composition evolving acid at high temperature, such as above 100° C. and in particular in the temperature range 150° to 450° C.

The following results using a Metrohm 895 PVC Thermomat used according to ISO 182 Part 3 illustrate the benefits of the high surface area material of the present invention. Inclusion level 5% by weight of the named sample in PVC (Ineos K70). This method may also be used with non-PVC polymers, of the types previously mentioned, to also determine acid evolution.

TABLE 1

| Sample | Time (h) to 50 μS/cm (longer is better, lower HCl) |
|---|---|
| Control Polymer, PVC | 3.12 |
| With Zinc Stannate | 3.04 |
| With low surface area Calcium Stannate | 5.41 |
| Fine low surface area Calcium Stannate | 5.68 |
| With high surface area Calcium Stannate | 6.86 |
| With high surface area Calcium Hydroxy Stannate | 6.94 |

The high surface area Calcium Stannate and Calcium Hydroxy Stannate are as synthesised above. Fine low surface area Calcium Stannate as JP 59156915, approx. 2 $m^2/g$.

TABLE 2

| Sample | Time (h) to 50 μS/cm (longer is better, lower HCl) |
|---|---|
| Control Polymer, PVC | 3.12 |
| With Zinc Stannate | 3.04 |
| With low surface area Barium Stannate | 5.20 |
| With high surface area Barium Stannate | 6.87 |
| With high surface area Barium Hydroxy Stannate | 6.90 |

This shows that material produced by the present invention is more effective at eliminating acid evolution from a polymer comprising a component capable of creating an acid. The nature of an acid is not considered to be significant to the applicability of the present method and is applicable beyond HCl produced by PVC. For example, the materials are also effective when incorporated in Polytetrafluoroethylene.

In addition, whilst calcium stearate is a known polymeric heat stabiliser for limiting acid evolution and the magnesium, calcium and barium stannates of the present invention are more weight effective and also provide a thermal stabilisation effect. The effect of the materials of the present invention is therefore greater than due to the presence of the metal ion alone.

Figure 1:
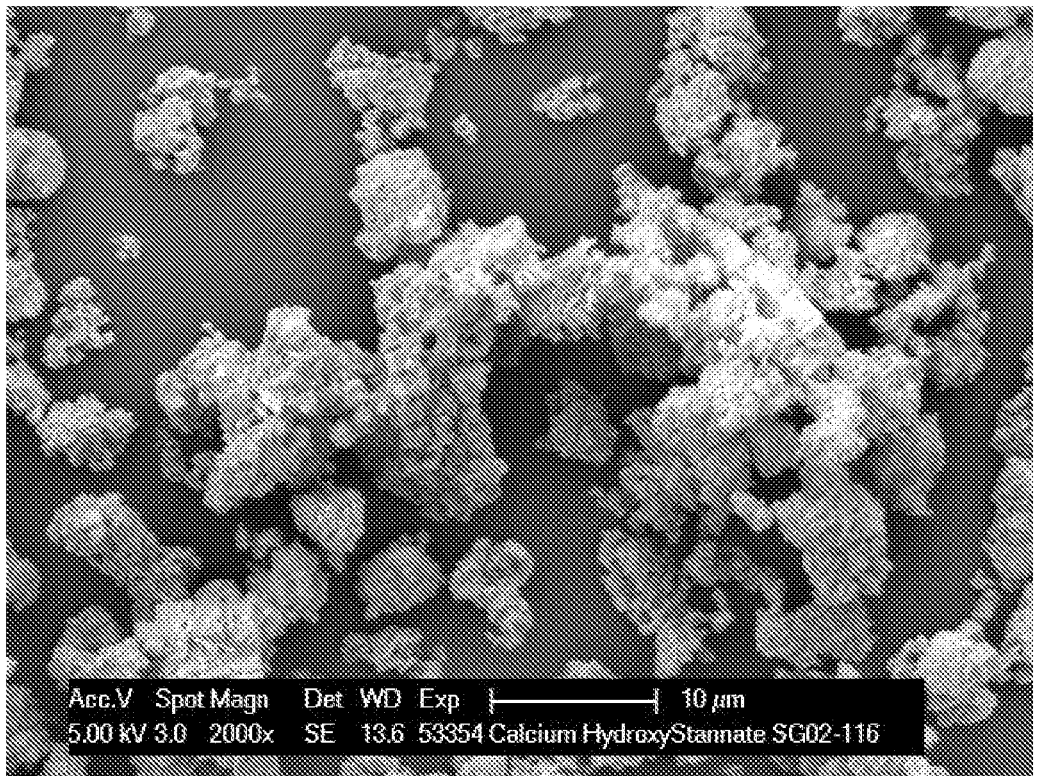
FIG. 1 shows a two thousand times magnification of Calcium Hydroxystannate produced by the present invention.
Figure 2:
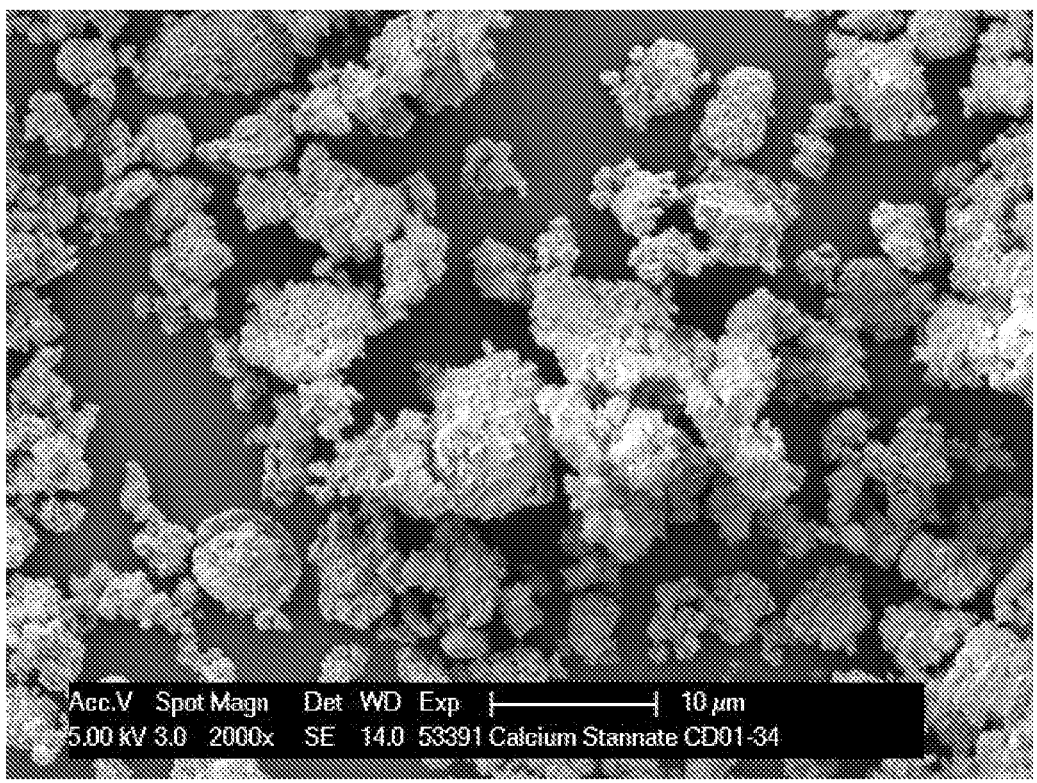
FIG. 2 shows a two thousand times magnification of calcium stannate produced by the present invention.
Figure 3:
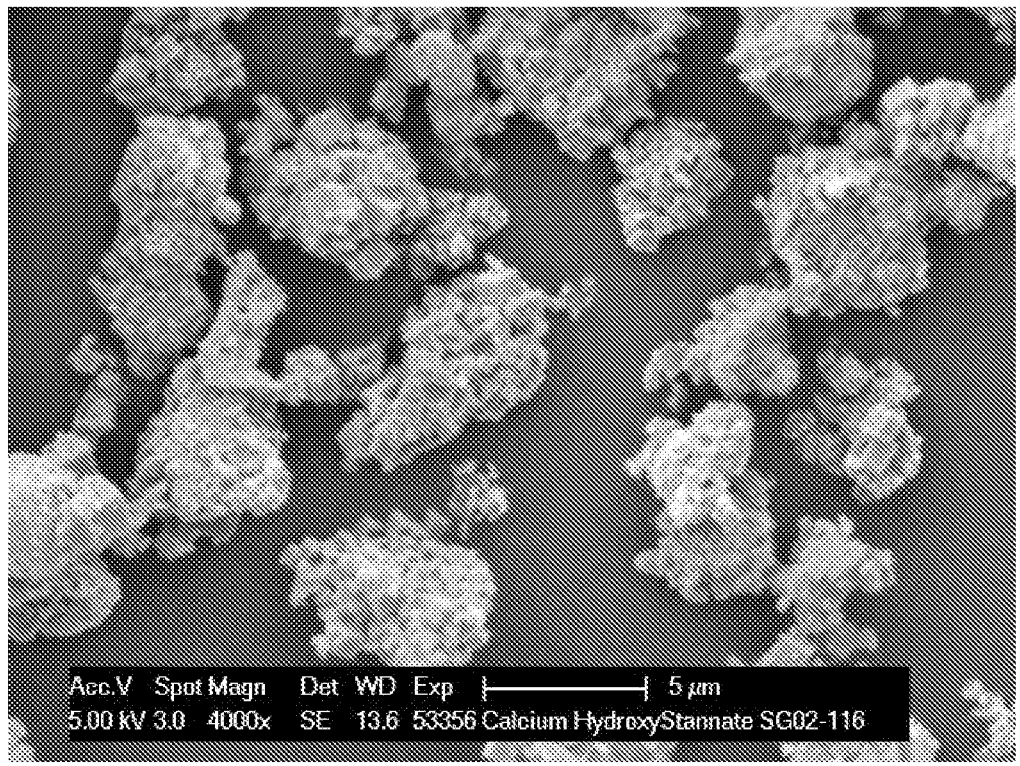
FIG. 3 shows a four thousand times magnification of Calcium Hydroxystannate produced by the present invention.
Figure 4:
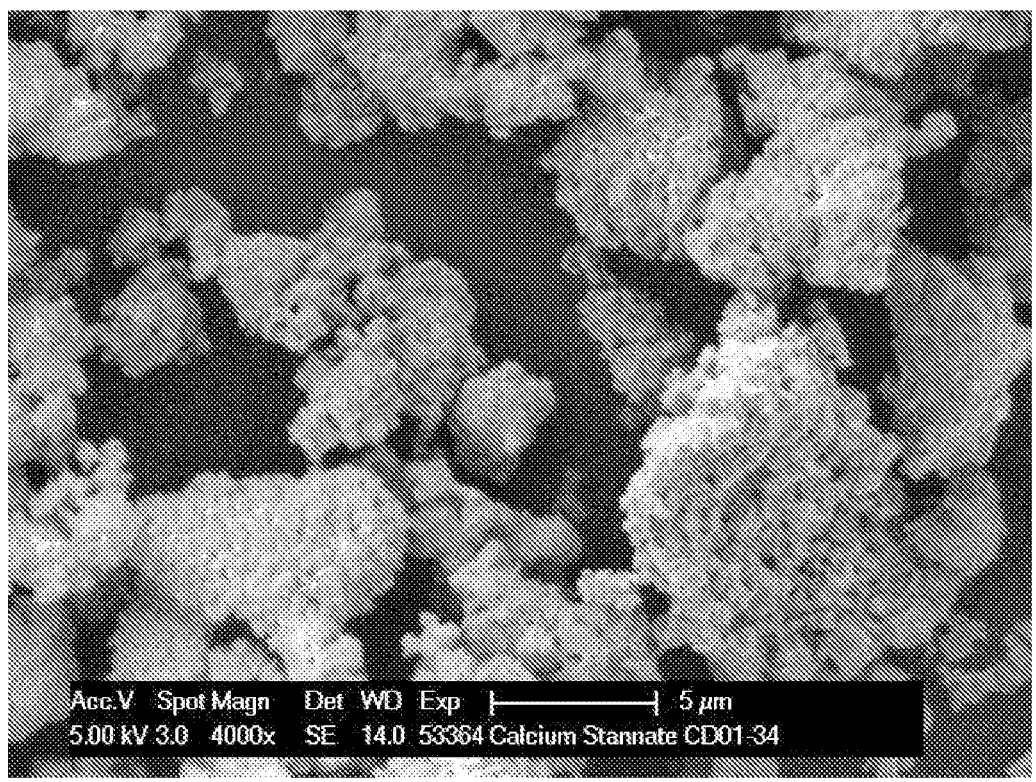
FIG. 4 shows a four thousand times magnification of calcium stannate produced by the present invention.
Figure 5:
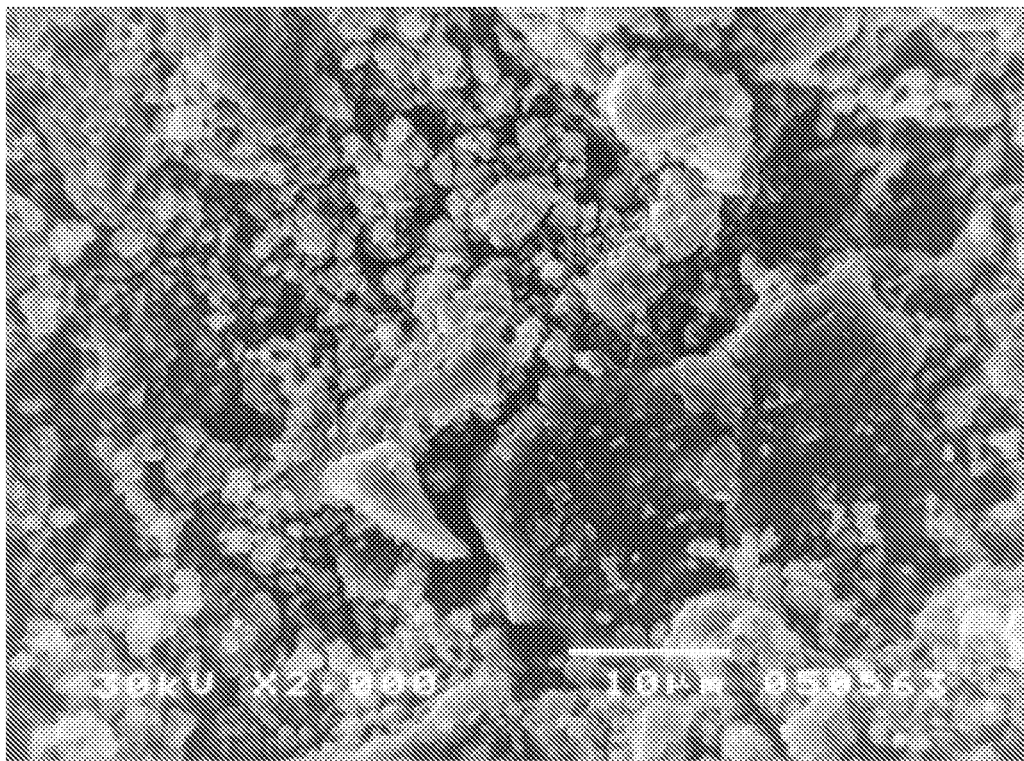
FIG. 5 shows a two thousand times magnification of stannate produced by a comparative method.
Figure 6:
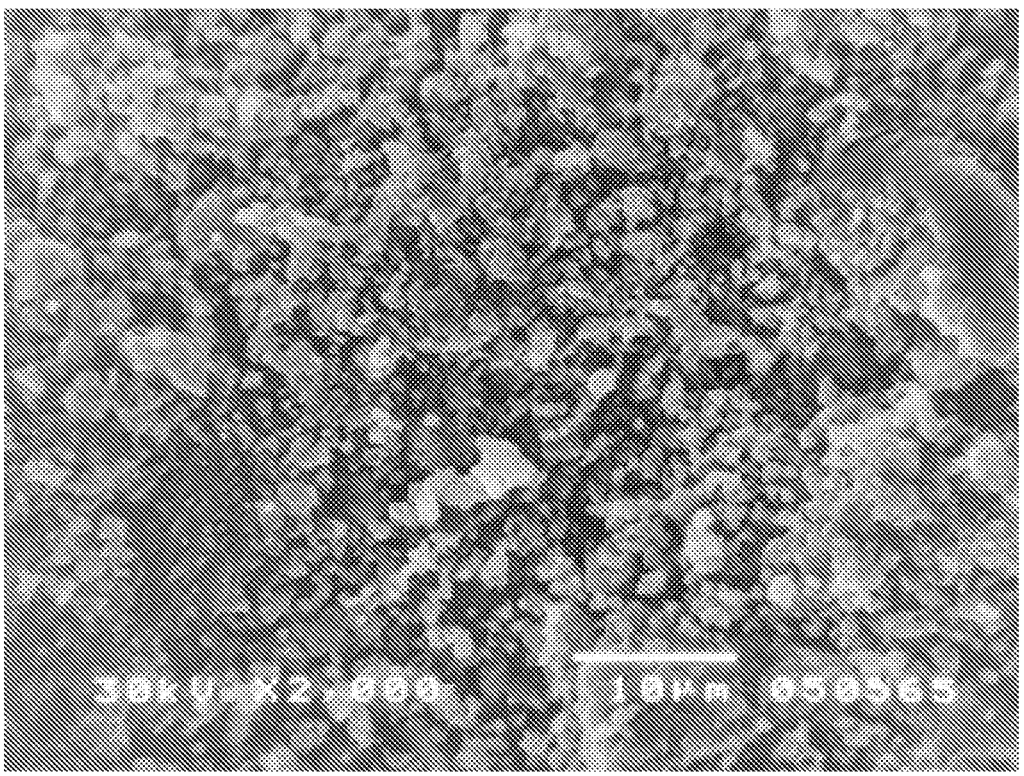
FIG. 6 shows a two thousand times magnification of stannate produced by a comparative method.

the comparative method and micrographs are as disclosed in T. Ivetić1, M. V. Nikolić, P. M. Nikolić, V. Blagojević, S. Đuđić, T. Srećković and M. M. Ristić, Science of Sintering, 39 (2007) 153-160, Investigation of Zinc Stannate Synthesis Using Photoacoustic Spectroscopy. This article is particularly relevant as its objective is to provide a high surface area stannate. The figures clearly show the contrast between the very high surface area of the present method which comprises a combination of large cubic crystals which cement together a matrix of finer particulate material having high porosity.

It has also been found that when polymer, such as PVC, polyethylene, polypropylene and PTFE is extruded under pressure and temperature in an injection moulding apparatus that the backpressure can increase over time. However, a composition in which a zinc stannate is replaced by a calcium stannate (composition as tables 1 and 2) show that backpressure increase over time is reduced. This is attributed to a lubricating effect from the calcium stannate. This is particularly marked for PVC where HCl gas evolution may also contribute to backpressure. A preliminary comparison of Temperatures herein are 20° C. unless specified otherwise, pressure is atmospheric pressure. Test methods are those methods current at the date of application.

What is claimed is:

1. An alkaline earth metal stannate or an alkaline earth metal hydroxystannate, where an alkaline earth metal is; having a surface area using the B.E.T. method of from 20 to 200 $m^2/g$, and the alkaline earth metal stannate or the alkaline earth metal hydroxystannate is in a form of particles and a surface weighted mean D(3,2) particle size as determined by light scattering is 1 to 4 microns.

2. The alkaline earth metal stannate or the alkaline earth metal hydroxystannate of claim 1 in which the surface area is from 50 to 90 $m^2/g$.

3. The metal stannate or hydroxystannate of claim 1 in which the surface weighted mean D(3,2) particle size as determined by light scattering is 1.5 to 3.0 microns.

4. A polymer comprising a component that evolves acid at elevated temperature in combination with the alkaline earth metal stannate or the alkaline earth metal hydroxystannate of claim 1.

5. The polymer of claim 4 in which the polymer is polyvinyl chloride.

6. A masterbatch comprising 20% by weight or more of the alkaline earth metal stannate or the alkaline earth metal hydroxystannate of claim 1.

7. The masterbatch of claim 6 in which the masterbatch comprises one of polyvinyl chloride, a polyolefin or a polyamide.

* * * * *

UNITED STATES PATENT AND TRADEMARK OFFICE
CERTIFICATE OF CORRECTION

| | |
|---|---|
| PATENT NO. | : 11,834,344 B2 |
| APPLICATION NO. | : 16/324825 |
| DATED | : December 5, 2023 |
| INVENTOR(S) | : David Crossley |

Page 1 of 1

It is certified that error appears in the above-identified patent and that said Letters Patent is hereby corrected as shown below:

In the Claims

Claim 1, Column 5, Line 22, "where an alkaline earth metal is;" should read -- where an alkaline earth metal is Ca; --.

Signed and Sealed this
Sixteenth Day of December, 2025

John A. Squires
*Director of the United States Patent and Trademark Office*